Feb. 28, 1956 E. J. BRUSELL 2,736,232

MULTIFOCAL INSERTS FOR OPHTHALMIC LENSES

Filed Dec. 2, 1949

INVENTOR

Ernest J. Brusell

BY Robert M. Dunning

ATTORNEY

United States Patent Office 2,736,232

Patented Feb. 28, 1956

2,736,232

MULTIFOCAL INSERTS FOR OPHTHALMIC LENSES

Ernest J. Brusell, St. Paul, Minn.

Application December 2, 1949, Serial No. 130,724

4 Claims. (Cl. 88—54)

My invention relates to an improvement in multifocal inserts wherein it is desired to provide lenses for eye glasses with which work can be conveniently seen at various distances.

In a previous application Serial No. 76,244, filed February 14, 1949, and now abandoned, I described a bifocal insert of generally triangular shape with the deepest portion of the insert nearest the inner edge of its lens. This insert was so arranged as to be in the line of vision while looking at an object close at hand. When reading or examining a relatively close object, the eyes tend to turn toward one another. The bifocal insert is of proper shape so that the object may be clearly seen when the eyes are turned inwardly. When looking at an object at a greater distance, the line of vision from the two eyes becomes more nearly parallel. Thus when the eyes are viewing an object at a greater distance, the line of vision may extend through the portion of the lenses beneath the diagonal lower edge of the insert.

An object of the present invention lies in the provision of a trifocal or intermediate vision insert located in the area of the lens through which the line of vision extends when looking downwardly at an object located at a greater distance from the eyes. This trifocal insert is preferably arranged to provide best vision at a medium distance, as for example at arms length. When the eyes are cast downwardly and focused on a point located at approximately arms length, the line of vision will pass beneath the generally triangular bifocal or near vision insert and will pass through the trifocal insert. By looking still further downwardly, the line of vision may pass through the lens beneath both inserts to permit a clear vision at a still greater distance.

A feature of the present invention lies in the provision of a pair of glasses which may provide a clear vision at a medium distance, as well as at close range, and which will provide this clear vision while the eyes are directed downwardly. Such glasses are particularly useful for persons located at arms length from their work, as for example while sewing or working at a bench. The trifocal insert is arranged so as to be automatically in the line of vision as a person glances forwardly and downwardly.

A feature of the present invention lies in the fact that if desired the insert may be made in three parts, each of which may possess a different length of focus, or arranged with two of the parts having equal focus. For example, the bifocal insert may comprise a triangular area having greatest depth near the inner edges of the lenses and tapering in depth toward the outer edges of the lenses. An insert having a greater focal distance may be arranged above the triangular insert so that objects at arms length may be clearly viewed. A third insert portion may be located beneath the diagonal edge of the bifocal insert so as to come into view automatically as the eyes glance downwardly at an object arranged, for example at arms length. Thus the upper and lower segments of the insert may be arranged to provide clear view of an object at arms length, while the triangular intervening section is focused at a closer distance so as to provide a clear view of material being read or closely examined.

These and other objects and novel features of the invention will be more clearly and fully set forth in the following specification and claims.

In the drawings forming a part of the specification:

Figure 1:
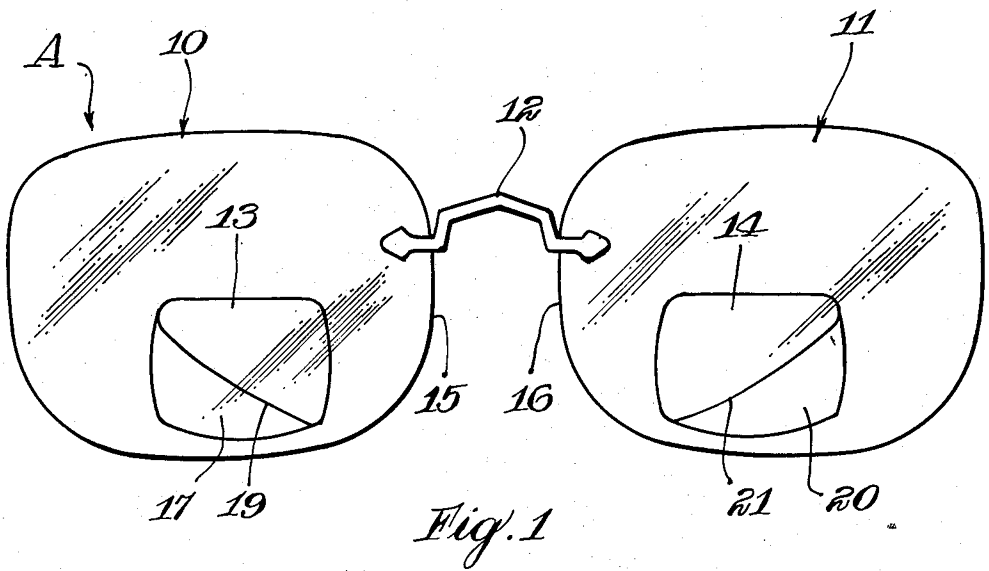
Figure 1 is an elevation view of a pair of glasses showing inserts in the lenses having different focal lengths.

The eyeglasses A illustrated in Figure 1 of the drawings include a pair of lenses 10 and 11 which are connected in any suitable manner as by a bridge 12. The glasses may be provided with temples foldably connected thereto and may or may not be provided with glasses frames. In view of the fact that the construction of the frames or lens connections forms no part of the present invention, except to properly space the lenses, this construction is not shown in detail.

The lenses 10 and 11 are each provided with an insert of the type commonly known as a bifocal or reading insert. The inserts are of generally triangular form as described in my previous application above referred to. The lens 10 is provided with a bifocal insert 13, while the lens 11 is provided with a bifocal insert 14. The inserts 13 and 14 are preferably similar in size and shape, but are oppositely arranged in the lenses. It will be noted that the inserts are of greatest vertical depth at a point nearest the inner or nasal edges of the lenses. The insert 13 is thus of greatest depth nearest the inner or nasal edge 15 of the lens 10, while the insert 14 is of greatest depth near the inner or nasal edge 16 of the lens 11. The point of greatest depth of the inserts is preferably spaced inwardly from the center of the lenses so as to be most effective when the lines of vision from the two eyes are directed inwardly toward a center point.

A trifocal or intermediate vision insert 17 is provided adjacent to the bifocal insert 13 and located beneath the diagonal lower edge 19 of this insert. Thus as the person glances at an object at medium distance from the glasses, as for example at arms length, the object may be seen clearly. While numerous combinations of lens insert arrangements may be employed, I prefer to have the insert 17 of greater focal length than the insert 13 so that if an object may be viewed close at hand through the insert 13, it may be most clearly viewed at a greater distance through the insert 17.

The insert 17 is preferably bounded along its upper edge by the diagonal edge 19 of the insert 13 and may be rounded along its lower edge or may be generally triangular in shape if preferred. The insert 20 of the lens 11 is similar to, but opposite from, the insert 17 and is joined to the insert 14 along the diagonal lower edge 21 of the insert 14.

The various inserts are preferably arranged so that when the eyes are viewing an object at a substantial distance, the lines of vision usually pass through the portion of the lenses above the inserts. When viewing the floor, or an object several feet distant, the lines of vision may pass through the lenses beneath the inserts. When looking slightly downward at an object close at hand, as while reading or examining papers, the lines of vision may pass through the bifocal inserts 13 and 14. While looking at such an object, the eyes have a tendency to turn inwardly toward a common center line and therefore the lines of vision may pass through the triangular inserts 13 and 14 with little difficulty.

If the eyes are focused toward an object at a somewhat greater distance, there is a tendency for the muscles of the eyes to relax so that the lines of vision are more nearly parallel. As a result, if the eyes are turned downwardly, the lines of vision have a tendency to extend through the areas 17 and 20 immediately below the inclined lines 19 and 21. When viewing an object at intermediate distance through these areas 17 and 20, the object can be seen clearly due to the intermediate focal length of the areas 17 and 20.

Figure 2:
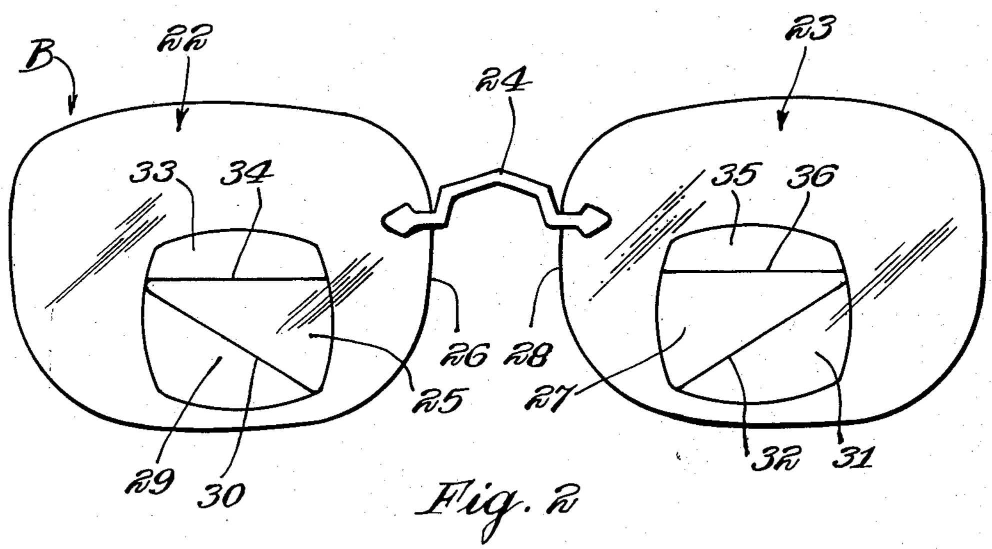
Figure 2 is a view similar to Figure 1, but showing a different arrangement of the inserts.

In Figure 2 of that drawings I disclose a modified form of construction which employs three different inserts which may each have a different focal length, or which may be arranged with two of the inserts having the same focal length. The glasses B include lenses 22 and 23 which are connected by a bridge 24 or other suitable connection. The glasses B may be provided with frames, bows, and other attached parts which simplify their support. As such attachments have no part of the present invention, other than to properly space the lenses, the structure is not shown in detail.

The lens 22 is provided with a generally triangular insert 25 which has its greatest depth nearest the inner or nasal edge 26 of the lens. The lens 23 is provided with a generally triangular insert 27 having its greatest depth at a point nearest the inner or nasal edge 28 of the lens. In general the inserts 25 and 27 are similar to the bifocal inserts or reading segments described in my previous application. A second insert 29 is provided joining the insert 25 along the diagonal line of connection 30. A similar insert 31 joins the insert 27 along the diagonal line of connection 32. A third insert 33 may join the insert 25 along its upper edge 34. A similar insert 35 may be provided adjoining the upper edge 36 of the insert 27. As a result three different inserts are provided which may all be of different focal lengths if desired.

The glasses B include the triangular inserts 25 and 27 which are preferably employed to provide a clear view of objects held close to the eyes. As the lines of vision from the eyes tend to converge at a common focus point relatively close to the eyes when reading or when examining an object close at hand, the triangular shape of the inserts will provide the necessary depth for proper visibility. The inserts 33 and 35 above the bifocal inserts 25 and 27 act in the manner of the usual trifocal or intermediate vision insert, and are useful in observing an object at a medium distance, as for example at arms length.

The inserts 29 and 31 may have a focal length different from that of the inserts 33 or 35, or they may be of the same focal length. Thus when glancing downwardly at an object arranged at a greater distance, as for example beyond arms length, the lines of vision from the two eyes tend to assume a more nearly parallel relation so as to tend to naturally pass through the inserts 29 and 31. Thus, while glancing through these inserts, an object may be clearly viewed at a greater distance as for example at arms length.

In accordance with the patent statutes, I have described the principles of construction and operation of my multifocal inserts, and while I have endeavored to set forth the best embodiments thereof, I desire to have it understood that these are only illustrative thereof and that obvious changes may be made within the scope of the following claims without departing from the spirit of my invention.

I claim:

1. Multifocal eyeglasses including a pair of lenses, a two-power insert in each of said lenses, said inserts each having a reading segment and an intermediate vision segment, said intermediate vision segment being disposed beneath said reading segment, and said segments being joined along a line extending without interruption in a distinctly upwardly and outwardly direction from the nasal edge of said insert to the temporal edge thereof, said inserts each being so formed that said reading segment is of considerably greater vertical depth near its nasal edge than near its temporal edge thereby providing a near vision field which is of considerable vertical depth when the eyes are fully converged for reading and of diminished vertical depth when the eyes are less converged for more distant vision.

2. Multifocal eyeglasses including a pair of lenses, a two-power insert in each of said lenses, said inserts each having a reading segment and an intermediate vision segment, said intermediate vision segment being disposed beneath said reading segment and said segments being joined along a line extending without interruption in a distinctly upwardly and outwardly direction from the nasal edge of said insert to the temporal edge thereof, and said inserts each being so formed that said reading segment is of substantially greater vertical depth near its nasal edge than near its temporal edge and said intermediate vision segment is of substantially greater vertical depth near its temporal edge than near its nasal edge, thereby providing a near vision field which is of considerable vertical depth when the eyes are fully converged for reading and of diminished vertical depth when the eyes are less converged for more distant vision, and an intermediate vision field which is of inconsiderable vertical depth when the eyes are fully converged for reading and of considerable vertical depth when the eyes are less converged for more distant vision.

3. The eyeglasses of claim 2 in which the upper and lower edges of each of said two-power inserts extend along substantially horizontal lines.

4. The eyeglasses of claim 2 including a third segment adjoining the upper edge of each of said reading segments, said third segment being of different focal length than either said reading segment or the major lens.

References Cited in the file of this patent

UNITED STATES PATENTS

| | | |
|---|---|---|
| 1,906,672 | Toulmin | May 2, 1933 |
| 1,912,165 | Silverman | May 30, 1933 |
| 2,048,304 | Tillyer et al. | July 21, 1936 |
| 2,183,885 | Heavyside | Dec. 19, 1939 |
| 2,328,584 | Rones | Sept. 7, 1943 |

FOREIGN PATENTS

| | | |
|---|---|---|
| 427,736 | Great Britain | Apr. 23, 1935 |
| 435,109 | Great Britain | Sept. 9, 1935 |